United States Patent [19]
Diamant

[11] Patent Number: 5,978,040
[45] Date of Patent: Nov. 2, 1999

[54] DEFLECTION CIRCUITS FOR WIDE SCREEN DISPLAYS

[75] Inventor: Robert Karoly Diamant, Zurich, Switzerland

[73] Assignee: RCA Thomson Licensing Corporation, Princeton, N.J.

[21] Appl. No.: 08/913,801

[22] PCT Filed: Apr. 24, 1996

[86] PCT No.: PCT/IB96/00372

§ 371 Date: Sep. 22, 1997

§ 102(e) Date: Sep. 22, 1997

[87] PCT Pub. No.: WO96/34489

PCT Pub. Date: Oct. 31, 1996

[30] Foreign Application Priority Data

Apr. 24, 1995 [GB] United Kingdom .................. 9508289

[51] Int. Cl.[6] .............................. H04N 5/46; H04N 3/27
[52] U.S. Cl. ........................................ 348/556; 348/704
[58] Field of Search .................................... 348/556, 745, 348/746, 747, 806, 704; 315/370, 371, 408, 411; H04N 3/27, 3/223, 3/22, 5/46

[56] References Cited

U.S. PATENT DOCUMENTS

| | | | |
|---|---|---|---|
| 5,287,042 | 2/1994 | Haferl | 315/370 |
| 5,294,987 | 3/1994 | Saeger et al. | 358/536 |
| 5,301,025 | 4/1994 | Hatano et al. | 348/704 |

FOREIGN PATENT DOCUMENTS

| | | |
|---|---|---|
| 0554836 | 2/1993 | European Pat. Off. . |
| 0578162 | 5/1993 | European Pat. Off. . |
| 3331567 | 9/1983 | Germany . |
| 2140640 | 11/1984 | United Kingdom . |

*Primary Examiner*—Sherrie Hsia
*Attorney, Agent, or Firm*—Joseph S. Tripoli; Joseph J. Laks; Francis A. Davenport

[57] ABSTRACT

A television receiver comprising a video display with a wide width to height ratio, horizontal and vertical deflection circuits for generating selectable rasters of different sizes on the video display by modifying horizontal deflection signals, a circuit (Rs) responsive to a vertical deflection signal and generating a first control signal, a waveform generator responsive to the first control signal and generating a substantially parabolic signal, a raster distortion correction circuit responsive to the substantially parabolic signal, and a source of a second control signal indicative of a selected horizontal raster width and the horizontal deflection being modified responsive to the second control signal.

5 Claims, 11 Drawing Sheets

DEFLECTION CIRCUITS FOR WIDE SCREEN DISPLAYS

BACKGROUND OF THE INVENTION

1. Field of the Invention

This invention relates to the field of wide screen television receivers and video displays, and in particular, to wide screen television receivers and video displays in which different display modes having different picture sizes are implemented by manipulating deflection circuits and raster sizes.

2. Description of Related Art

When referring to a television picture, there are actually two aspect ratios. One aspect ratio is that which describes the outer boundary or borders of the picture. In conventional television receivers, this aspect ratio is 4:3. The horizontal factor usually appears first. In wide screen television receivers, this aspect ratio is, for most manufacturers, 16:9. The second aspect ratio is that which describes the images which are displayed on the television screen. A perfectly round circle, for example, which appears on a television screen as a perfectly round circle, has an aspect ratio of 1:1. If the same circle is displayed on a wide screen television receiver, without any corrective measures, the circle will appear to be an oval, which is elongated along the horizontal axis. If the receiver is 16:9, the circle will have an aspect ratio of approximately 1.3:1. If the same circle is displayed on a wide screen television receiver, with appropriate corrective measures, the circle will appear to be a perfect circle, and will have an aspect ratio of 1:1. Two expressions are used herein regarding aspect ratio in order to avoid confusion. One expression is "format display ratio" and the other is "image aspect ratio".

The expression "format display ratio" refers to the width to height ratio of the boundaries or borders of a picture. The format display ratio of a video signal from a conventional video source is 4:3. The format display ratio of a conventional television receiver is 4:3. The format display ratio of a video signal from a wide screen video source is 16:9 (sometimes 5:3, sometimes another wide ratio). The format display ratio of a wide screen television receiver is 16:9 (sometimes 5:3, sometimes another wide ratio).

The expression "image aspect ratio" refers to the width to height ratio of images within a picture. Images having an image aspect ratio of 1:1 will appear without image aspect ratio distortion. Images not having an image aspect ratio of 1:1 will appear with image aspect ratio distortion.

Wide screen television receivers and displays have several particularly useful, and in some cases critical, display modes. These display modes include: displaying pictures from video sources having conventional format display ratios, without image aspect ratio distortion; displaying pictures from video sources having wide screen format display ratios, without image aspect ratio distortion; displaying pictures from video sources having conventional format display ratios, in an enlarged size, without image aspect ratio distortion.

Displaying pictures from video sources having conventional format display ratios, in an enlarged size and without image aspect ratio distortion, often results in a portion of the picture at the top and bottom being cropped. This portion is one-third, if the wide screen display is 16:9 and the size is enlarged horizontally and vertically by factors of four-thirds. If the enlarged picture is vertically centered, then one-sixth of the picture will be cropped from the top and one-sixth of the picture will be cropped from the bottom.

This cropping raises two operating mode issues. One issue is that a viewer might be willing to accept a certain amount of image aspect ratio distortion in order to reduce cropping and see more of the picture. In this case, another desirable display mode would be displaying pictures from video sources having conventional format display ratios, in an enlarged size, with a small but acceptable amount of image aspect ratio distortion. The other issue is that subtitles and other kinds of information might be in the cropped part of the picture. A viewer might very well consider the subtitles or other information to be critical, but is unwilling to accept image aspect ratio distortion. In this situation, yet another desirable display mode would be displaying pictures from video sources having conventional format display ratios, in an enlarged size and without image aspect ratio distortion, but panned upwardly so as to display the subtitles or other information and crop only, or substantially only from the top of the picture.

A vertical shift is required to make the hidden portions of the picture visible. This can be obtained by superimposing a DC component on the vertical deflection current. This requires a vertical deflection amplifier with DC coupling and sufficient output current range. Such an amplifier has the disadvantage of increased dissipation losses. Another approach is to use a floating DC current source connected in parallel to the vertical deflection yoke. The dynamic range of the output voltage of the current source must be large enough to account for the flyback pulse. A disadvantage of current superposition is that the vertical linearity correction and the East-West side pincushion distortion correction have to be readjusted when the vertical shift is changed.

U.S. Pat. No. 5,287,042 discloses a switching arrangement to control the horizontal deflection amplitude. In a first condition, a raster is generated having a deflection amplitude and a deflection correction parameter corresponding to a first aspect ratio. In a second selectable condition, a raster is produced having a deflection amplitude and deflection correction parameter corresponding to a second aspect ratio. An additional inductance is coupled to the deflection yoke and is short-circuited in one selectable condition in order to conduct deflection current via the inductor.

EP A 0578162 discloses a vertical panning system including a panning circuit which generates a vertical reset signal which is phase shifted by a selected number of horizontal lines relative to the vertical synchronizing component of the video signal.

Implementing all of the display modes described above can be expensive and require considerable signal processing power. These display modes also create problems in correcting typical raster distortion problems, such as side pincushion distortion, as the picture or raster size is changed.

SUMMARY OF THE INVENTION

In accordance with an inventive arrangement, a wide screen television receiver or display implements the various display modes describe above in a relatively inexpensive manner, and at the same time, provides for correction of typical raster distortion problems, such as side pincushion distortion.

In accordance with another inventive arrangement, a wide screen television receiver or display implements the various display modes described above by manipulation of the horizontal and vertical deflection circuits to provide a raster for a wide screen video display having selectable horizontal widths and vertical heights, that is, having selectable display format ratios.

In accordance with still another inventive arrangement, a wide screen television receiver or display automatically corrects for side pincushion distortion as the horizontal and vertical scan amplitudes are changed to change the display modes from one to another.

In accordance with a presently preferred embodiment, three display modes are defined for showing pictures from conventional video sources, that is, having format display ratios of 4:3. These modes are designated "Standard", "Wide" and "Zoom".

The standard display mode will show such a conventional picture in its normal style and size by changing the format display ratio of the raster from 16:9 to 4:3, without changing vertical deflection height. Only the horizontal scan amplitude is changed; horizontal scan amplitude is reduced. Such a picture will have no image aspect ratio distortion and will not be cropped.

The wide display mode will show a conventional picture in an enlarged mode by changing the format display ratio of the raster from 16:9 to 4:3, without changing the horizontal scan amplitude. Only the vertical scan amplitude is changed; vertical scan amplitude is increased. There is a four-thirds vertical overscan, corresponding to the four-thirds horizontal overscan resulting from using the full width of the wide screen raster and display. The top and bottom one-sixth of the enlarged picture is cropped, but there is no image aspect ratio distortion.

The zoom display mode is similar to the wide mode, except that the vertical overscan factor is less than four-thirds. The enlarged picture is slightly compressed vertically. Less than the top and bottom one-sixth of the enlarged picture is cropped, but there is some image aspect ratio distortion.

In accordance with yet another inventive arrangement, a picture shift in an upward direction is implemented by delaying the vertical scan relative to the video signal. This allows the bottom of the WIDE mode 4:3 picture to be positioned close to the lower edge of the screen. This is particularly useful when subtitles are present. The vertical linearity correction and the East-West side pincushion distortion correction remain constant using this method. An alternative method of vertical picture positioning, using digital delay circuits, is also presented. This allows vertical panning upwards and downwards.

A television receiver, in accordance with one or more of the foregoing inventive arrangements, comprises: a video display having a raster with a wide height to width ratio; a source of supply voltage; a signal generator for a sawtooth waveform having a selectable amplitude; a first switch for controlling said amplitude of said sawtooth waveform; a vertical amplifier responsive to said sawtooth waveform and generating a vertical deflection signal which varies in accordance with said selected amplitude of said sawtooth waveform to enable selection of a vertical raster dimension; a horizontal deflection circuit energized by said supply voltage and generating a horizontal deflection signal for a horizontal deflection yoke to provide a first horizontal raster dimension; a signal source coupled to said horizontal yoke for modifying said horizontal deflection signal to provide a second horizontal raster dimension; a second switch for controlling said signal source and selecting one of said first and second horizontal raster dimensions; and, a raster width distortion correction circuit responsive to said vertical deflection signal and modulating said supply voltage energizing said horizontal deflection circuit, said raster width distortion being corrected for all combinations of said selectable vertical and horizontal raster dimensions.

Another television receiver, in accordance with one or more of the foregoing inventive arrangements, comprises: a video display having a raster with a wide height to width ratio; a source of supply voltage; a sawtooth waveform generator responsive to a source of vertical synchronizing signals, said sawtooth waveform having a selectable amplitude; a switchable phase delay circuit for delaying said vertical synchronizing signals; a first switch for enabling and inhibiting operation of said phase delay circuit, selection of said delayed vertical synchronizing signals providing an upwardly shifted vertical position of a picture on said video display, relative to a nominal vertical position of said picture; a second switch for controlling said amplitude of said sawtooth waveform; a vertical amplifier responsive to said sawtooth waveform and generating a vertical deflection signal which varies in amplitude in accordance with said selected amplitude of said sawtooth waveform to enable selection of a vertical raster dimension and which varies in phase in accordance with said selected phase of said vertical synchronizing signals to enable selection of a picture position; a horizontal deflection circuit energized by said supply voltage and generating a horizontal deflection signal for a horizontal deflection yoke to provide a first horizontal raster dimension; a signal source coupled to said horizontal yoke for modifying said horizontal deflection signal to provide a second horizontal raster dimension; a third switch for controlling said signal source and selecting one of said first and second horizontal raster dimensions.

Another television receiver, in accordance with one or more of the foregoing inventive arrangements, comprises: a video display with a wide width to height ratio; horizontal and vertical deflection circuits for generating selectable rasters of different sizes on said video display by modifying horizontal deflection signals; a circuit responsive to a vertical deflection signal and generating a first control signal; a waveform generator responsive to said first control signal and generating a substantially parabolic signal; a raster distortion correction circuit responsive to said substantially parabolic signal; and, a source of a second control signal indicative of a selected horizontal raster width, said horizontal deflection being modified responsive to said second control signal.

Another television receiver, in accordance with one or more of the foregoing inventive arrangements, comprises: a video display with a wide width to height ratio; a horizontal deflection circuit for generating a horizontal deflection current; a horizontal deflection yoke responsive to said horizontal deflection circuit; an inductor; a switch for operatively coupling said inductor to said horizontal deflection yoke; and, a source of a control signal indicative of a selected raster width, said switch being responsive to said control signal.

DETAILED DESCRIPTION OF THE PREFERRED EMBODIMENTS

Figure 1:
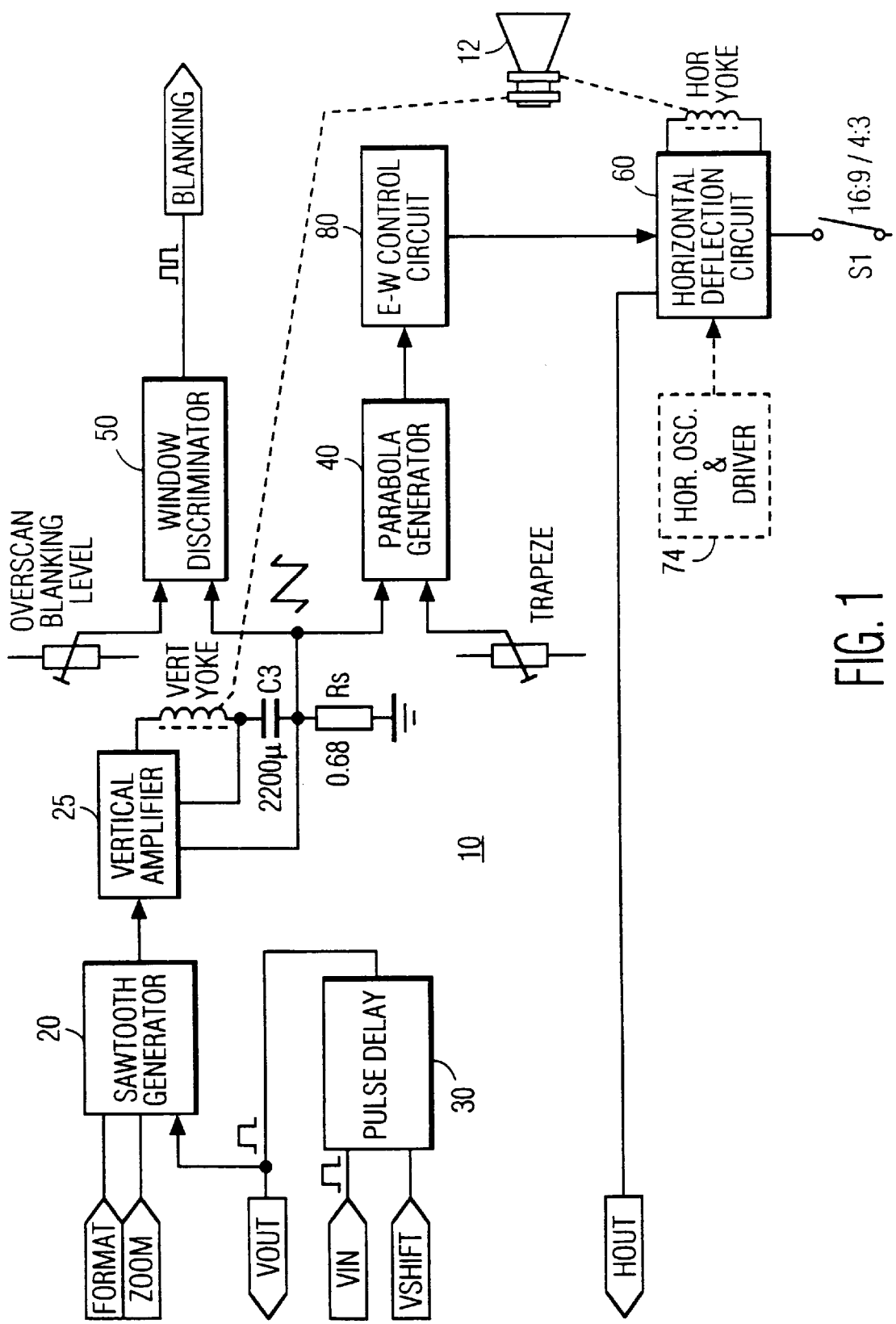
FIG. 1 is a block diagram of a television receiver in accordance with one or more inventive arrangements.

FIG. 1 shows the block diagram of a television receiver 10 in accordance with one or more inventive arrangements. FORMAT and ZOOM are control signals for the SAWTOOTH GENERATOR 20 to change the vertical deflection amplitude to the different display formats. The original vertical drive pulses VIN are fed to the PULSE DELAY circuit 30. The VSHIFT signal is used to control the delay time of the vertical drive pulses VOUT that synchronize the SAWTOOTH GENERATOR. These pulses are also used for the vertical synchronization of an On Screen Display circuit, not shown.

Information on vertical scan amplitude is taken from the deflection current sense resistor Rs of the VERTICAL AMPLIFIER 25 and is compared with the adjustable reference OVERSCAN BLANKING LEVEL in the WINDOW DISCRIMINATOR 60. The output signal BLANKING is used for suppressing the beam current during excessive vertical overscan. The voltage across Rs is also applied to the PARABOLA GENERATOR 40 that drives the East-West CONTROL CIRCUIT 80. Trapeze distortion is corrected by the TRAPEZE adjustment at the PARABOLA GENERATOR. The HORIZONTAL DEFLECTION CIRCUIT 60 has scan amplitude adaptation for 4:3 and 16:9 picture formats. A capacitor C3 provides DC isolation and AC coupling to signal ground for the vertical yoke via the sensing resistor Rs. The HORIZONTAL OSCILLATOR AND DRIVER 74 provides a driving signal for the HORIZONTAL DEFLECTION CIRCUIT 60.

The horizontal and vertical yokes are disposed on a cathode ray tube which forms a wide screen video display 12, that is, a video display having a wide format display ratio, for example 16:9.

Figure 2:
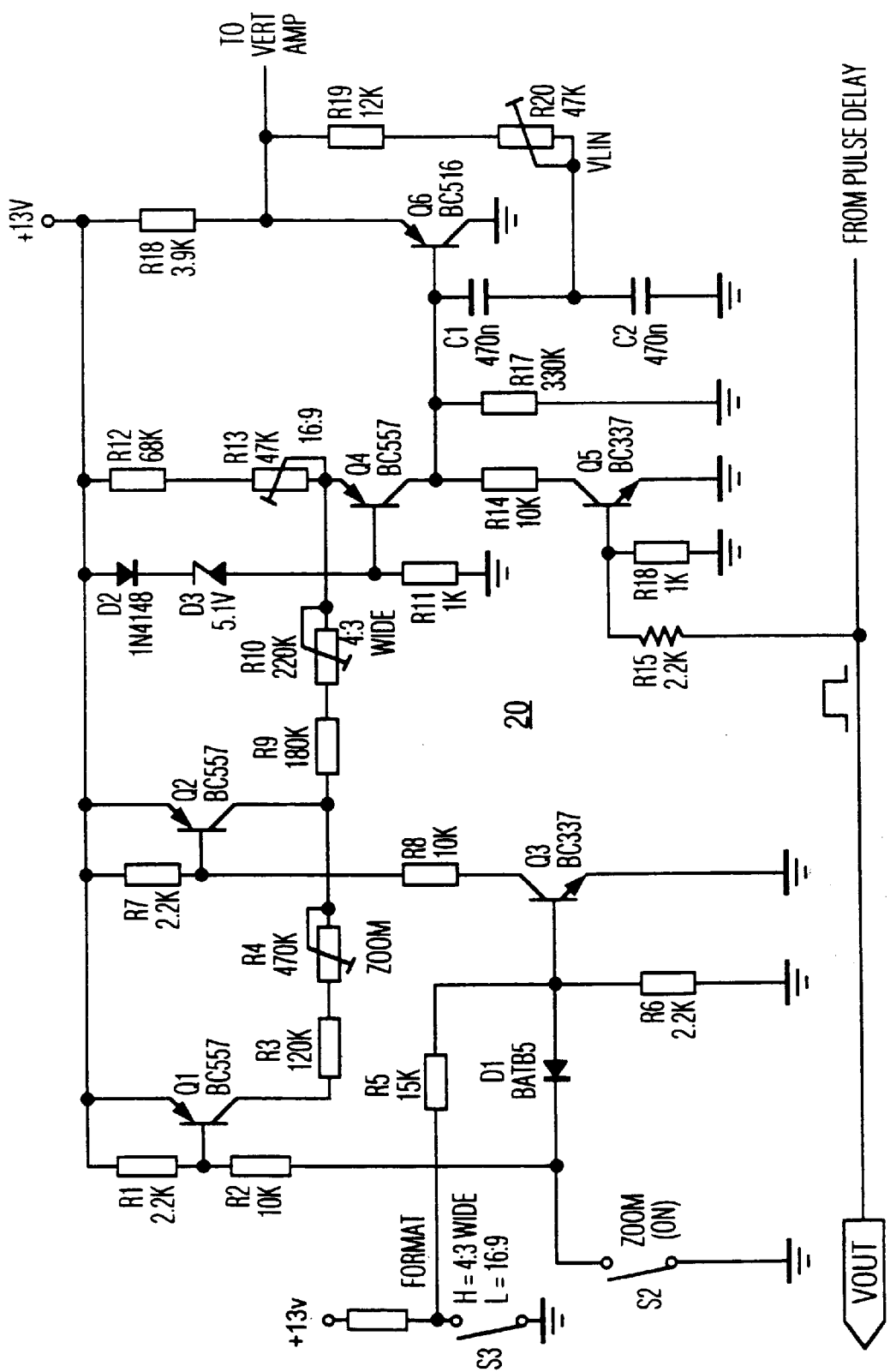
FIG. 2 is a schematic diagram of the sawtooth generator shown in FIG. 1.

FIG. 2 shows the circuit diagram of the sawtooth generator 20 of the vertical deflection circuit formed by the sawtooth generator 20 and the vertical amplifier 25. The vertical scan amplitude is altered by changing the output value of current source Q4 of the vertical sawtooth generator by applying the FORMAT signal to Q3 by switch S3. All of the switches shown herein, including switches S1 through S6, are illustrated as a toggle switches for purposes of simplification. Any or all of the switches can be implemented as manual switches or as a remote controlled switches or as a switches controlled by a microprocessor, for example responsive to a remote control signal. Any or all of the switches can also be implemented as semiconductor switches or as relays. The ZOOM display mode switch S2 is open. For 16:9 format display ratios and standard 4:3 pictures with dark side panels, FORMAT is low (e.g., 1V), therefore transistors Q1 through Q3 are off. The amplitude of the vertical sawtooth voltage is defined by the emitter current of Q4 that is adjusted by R13. For displaying a 4:3 picture in WIDE mode, FORMAT is high (e.g., 8V), Q2 and Q3 are on. Additional current is supplied from Q2 to the emitter of Q4, increasing the vertical scan amplitude. The picture height for 4:3 aspect ratio in the WIDE mode is adjusted by R10.

Irrespective of the FORMAT signal, vertical zooming is selected when switch S2 is closed. Transistors Q3 and Q2 are kept off since D1 is on. Q1 is on, supplying current to the emitter of Q4. The vertical size is reduced to approximately 85% of the amplitude during WIDE mode and is adjusted with R4. Resistors R15 and R16 form a potential divider for the vertical output signal from the pulse delay circuit 30 to the base of transistor Q5. The vertical sawtooth is buffered by Q6 driving the VERTICAL AMPLIFIER. Linearity is adjusted with R20 (VLIN) in the feedback path of Q6. Resistor R18 provides loading for the emitter of Q6. A capacitor C3 provides DC isolation and AC coupling to signal ground for the vertical yoke via the sensing resistor Rs. The HORIZONTAL OSCILLATOR AND DRIVER 74 provides a driving signal for the HORIZONTAL DEFLECTION CIRCUIT 60.

Figure 3:
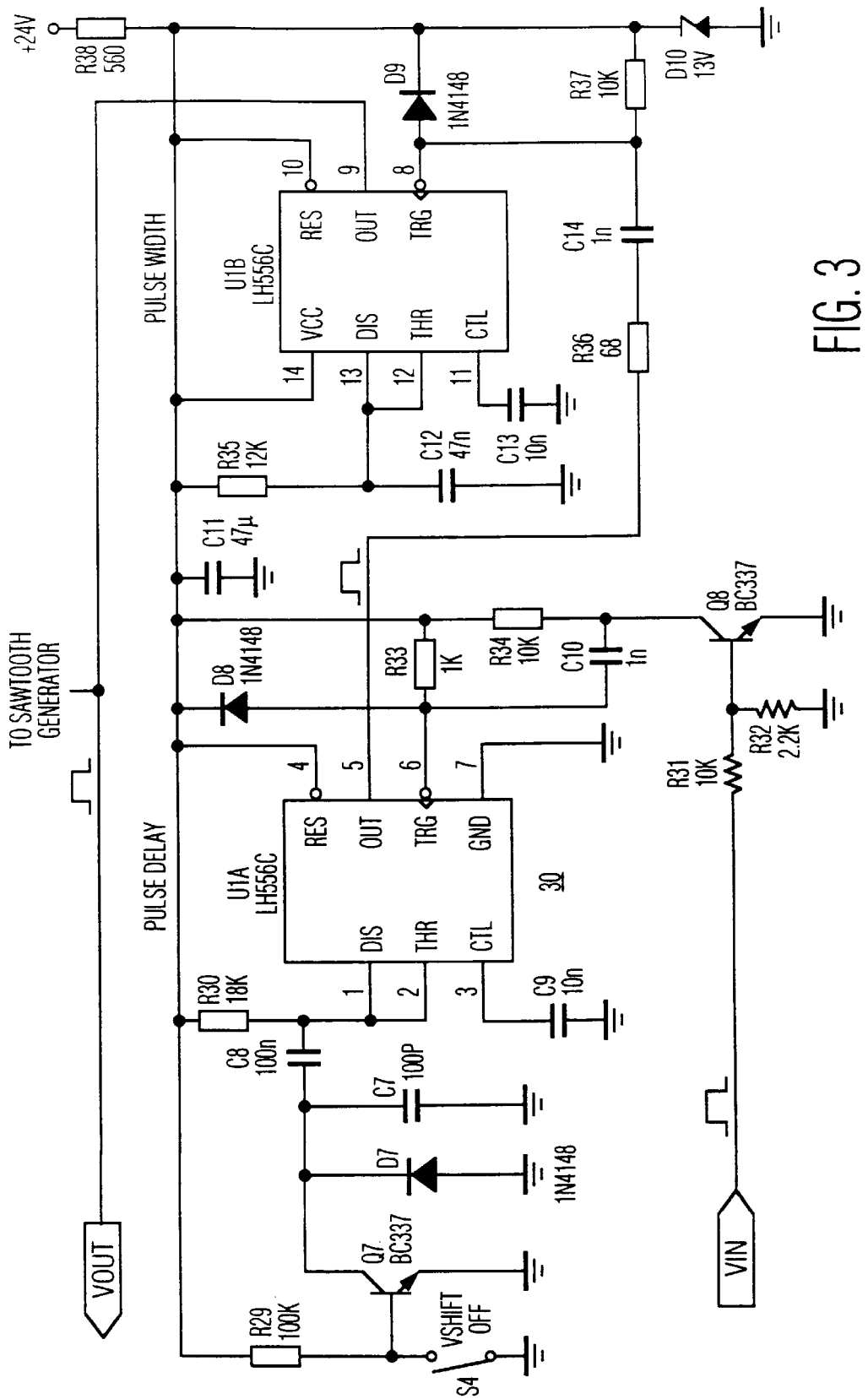
FIG. 3 is a schematic diagram of the pulse delay circuit shown in FIG. 1.
Figure 9:
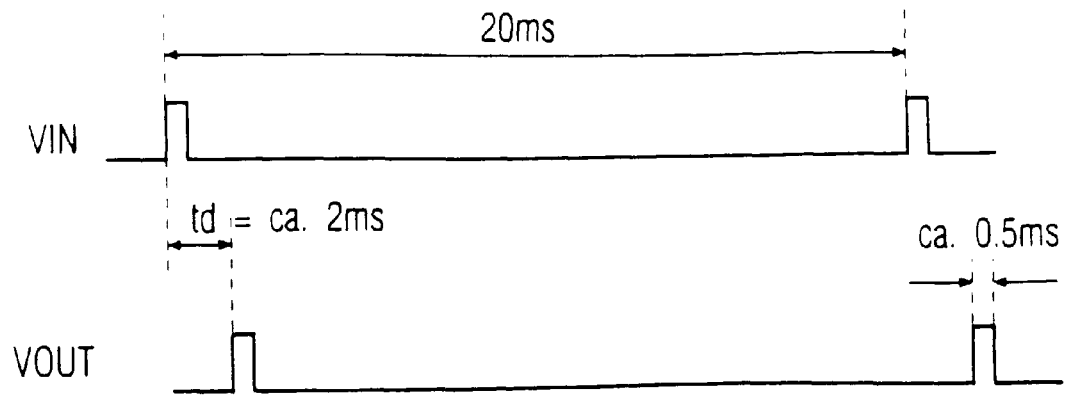
FIG. 9 is a timing diagram useful for explaining the operation of the pulse delay circuit shown in FIGS. 1 and 3.

In pulse delay circuit 30 in FIG. 3, the vertical drive pulses (VIN) are delayed by dual timer U1 and associated components. Transistor Q8 triggers U1A with the leading edge of negative going pulses differentiated by C 10 and R33. The pulse width of the output signal on pin 5 of U1A is selected with the VSHIFT switch S4. For vertical shift, S4 is open, therefore Q7 is on, shorting C7 and connecting C8 to ground. The resulting pulse width of approximately 2 msec is the delay time for the shifted picture. The VIN and VOUT waveforms are shown in FIG. 9.

Switch S4 is closed for vertical centering. This turns Q7 off, so that the timing capacitance becomes C7 and the delay is reduced to a negligible 2 μsec. The trailing edge of the output pulse from U1A triggers U1B via R36 and C14. The output pulse of approximately 0.6 msec duration at pin 9 of U1B is used to synchronize the sawtooth generator via Q5 and is available as VOUT for further use.

Figure 4:
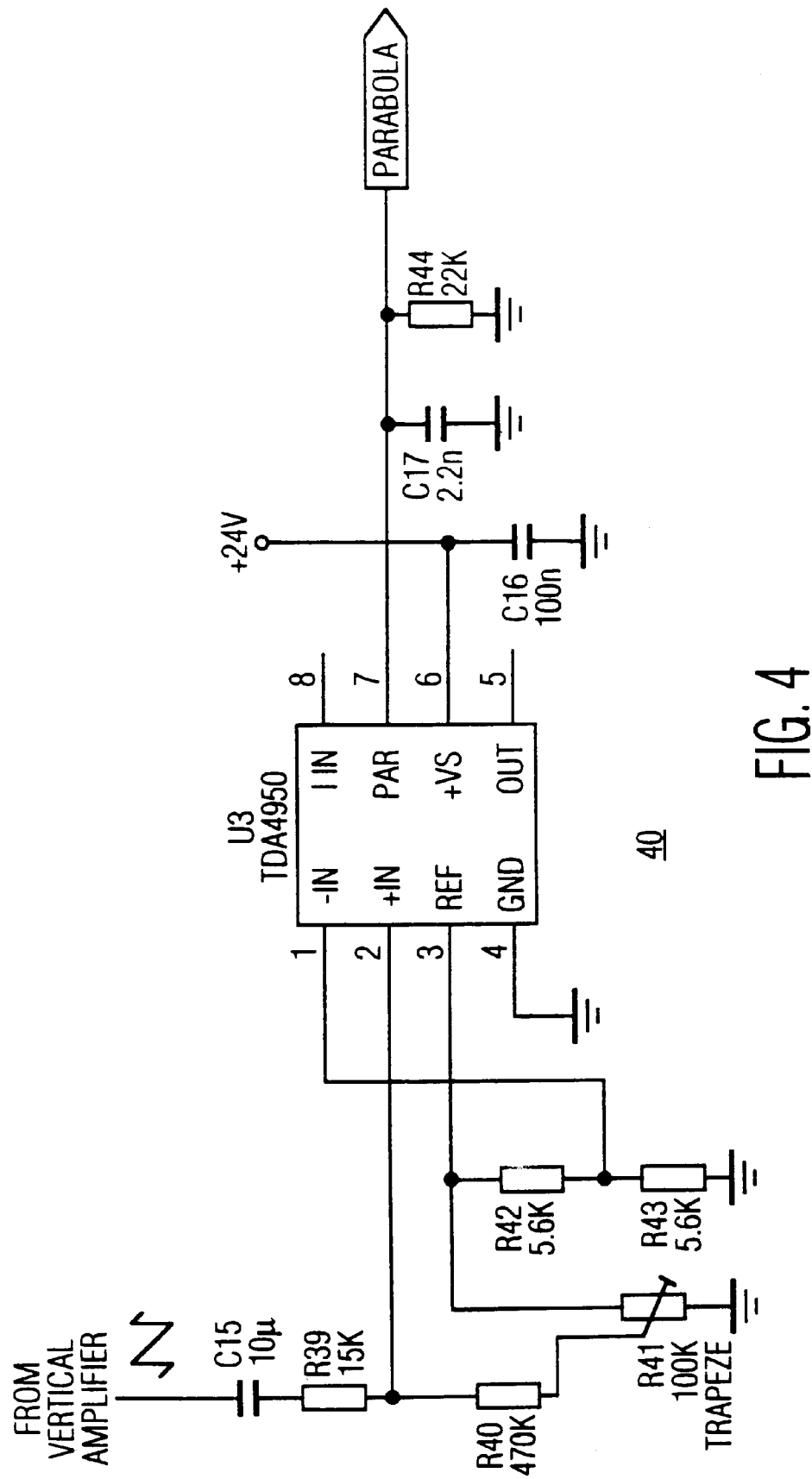
FIG. 4 is a schematic diagram of the parabola generator shown in FIG. 1.

The parabola generator 40 is shown in FIG. 4. The input signal for the parabola generator is the sawtooth voltage across sampling resistor Rs, which can have a value of 0.68 ohms. The sawtooth voltage from Rs is an input to pin 2 of U3.

Figure 8:
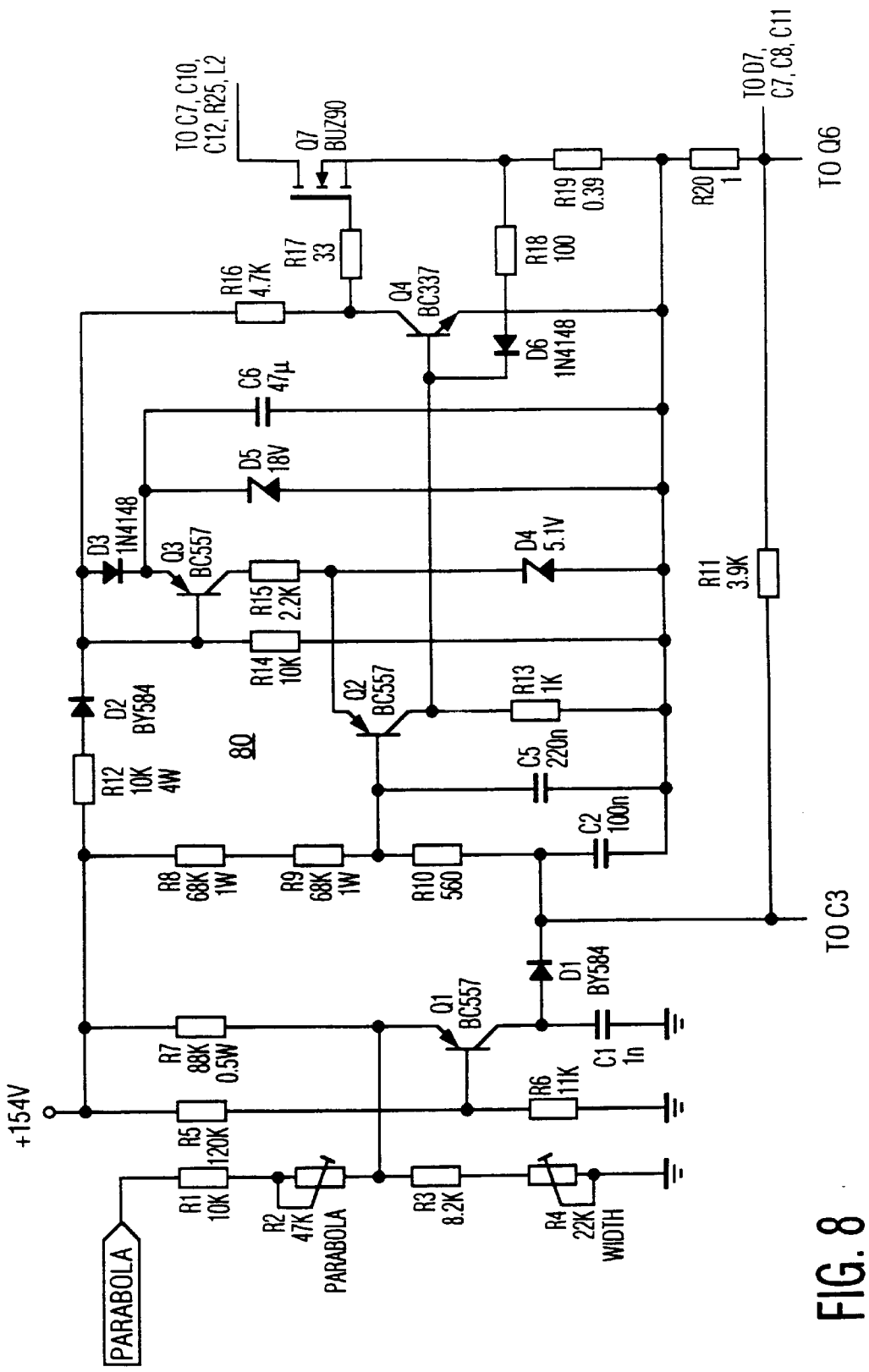
FIG. 8 is a schematic diagram of the East-West control circuit shown in FIGS. 1 and 6.

The output voltage from pin 7 of U3, which is substantially parabolic, is DC coupled to the East-West Control Circuit 80, shown in detail in FIG. 8. This keeps the peaks of the amplitude modulation of the horizontal deflection current constant over the entire range of the vertical scan amplitude. With AC coupling, the picture width and the E-W correction would vary depending on picture height.

With reference to FIGS. 1 and 2, switch S2 and/or switch S3 is/are a source of a control signal which selects a vertical deflection height. The sampling resistor Rs is a source of a further control signal indicative of the selected vertical deflection height. With reference to FIG. 4, the further control signal establishes the substantially parabolic signal as different vertical deflection heights are selected. The substantially parabolic signal is therefore also automatically adjusted as different vertical heights are selected. With reference to FIG. 8, the substantially parabolic signal controls the operation of transistor Q5. Parabolic modulation of the operation of transistor Q5 modulates the supply voltage to the horizontal output transistor, which automatically provides correction of side pincushion distortion for all selected vertical and horizontal scan amplitudes.

Figure 5:
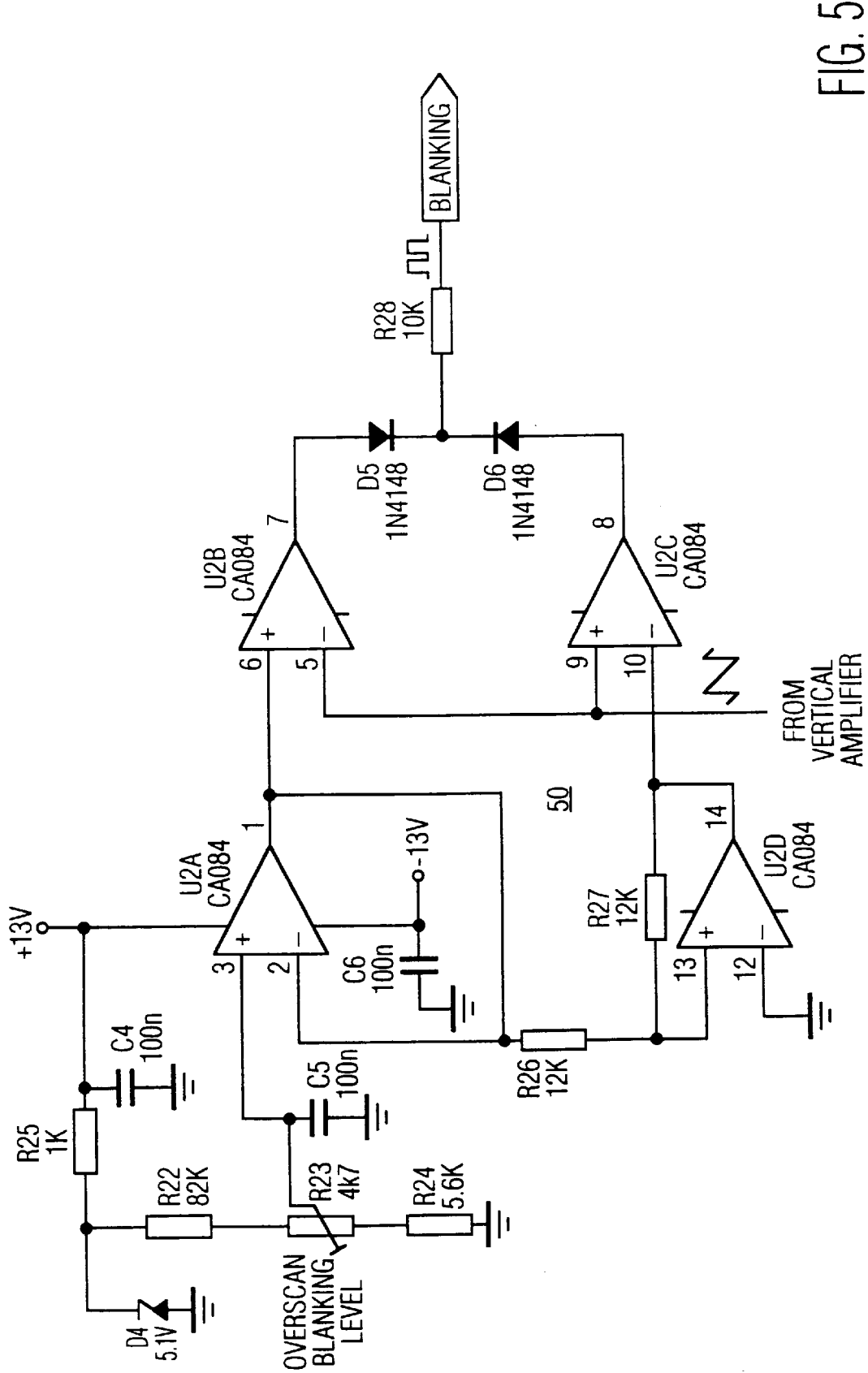
FIG. 5 is a schematic diagram of the window discriminator shown in FIG. 1.
Figure 10:
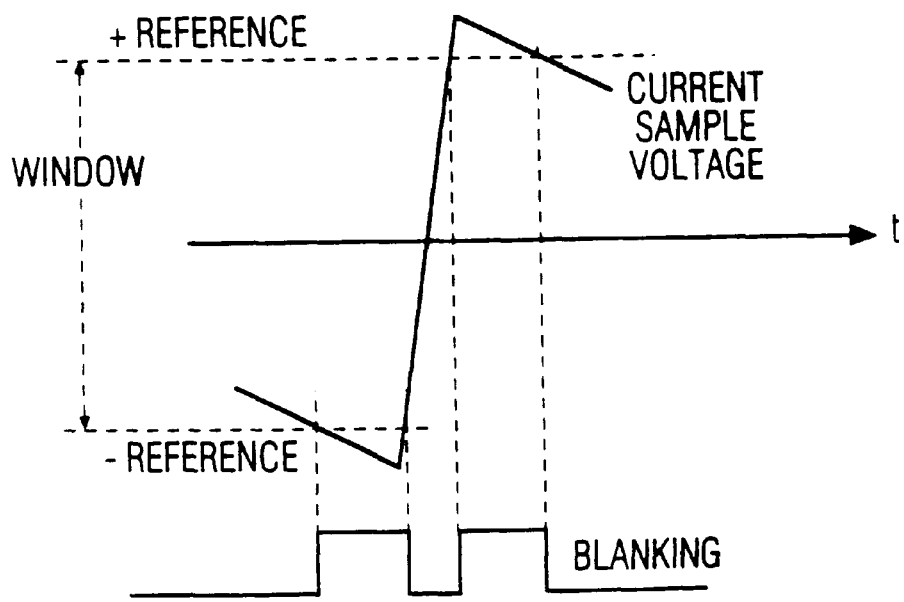
FIG. 10 is a timing diagram useful for explaining the operation of the window discriminator shown in FIGS. 1 and 5.

With reference to FIG. 5, the peak to peak amplitude of the vertical deflection current is monitored by a window discriminator built around quad OP AMP U2 to protect the picture tube against excessive vertical overscan. The current sampling voltage from Rs is connected to the non inverting input of U2B and the inverting input of U2C to detect overscan in both directions. Buffered OVERSCAN BLANKING LEVEL voltage with both polarities is applied to the other inputs of U2B and U2C respectively. For the duration of overscan, their outputs go positive, are combined by diodes D5 and D6 and are available via R28 for additional blanking of the beam current. FIG. 10 shows the current sampling voltage, the overscan blanking level for both polarities and the resulting output blanking signal of the window discriminator.

Figure 6:
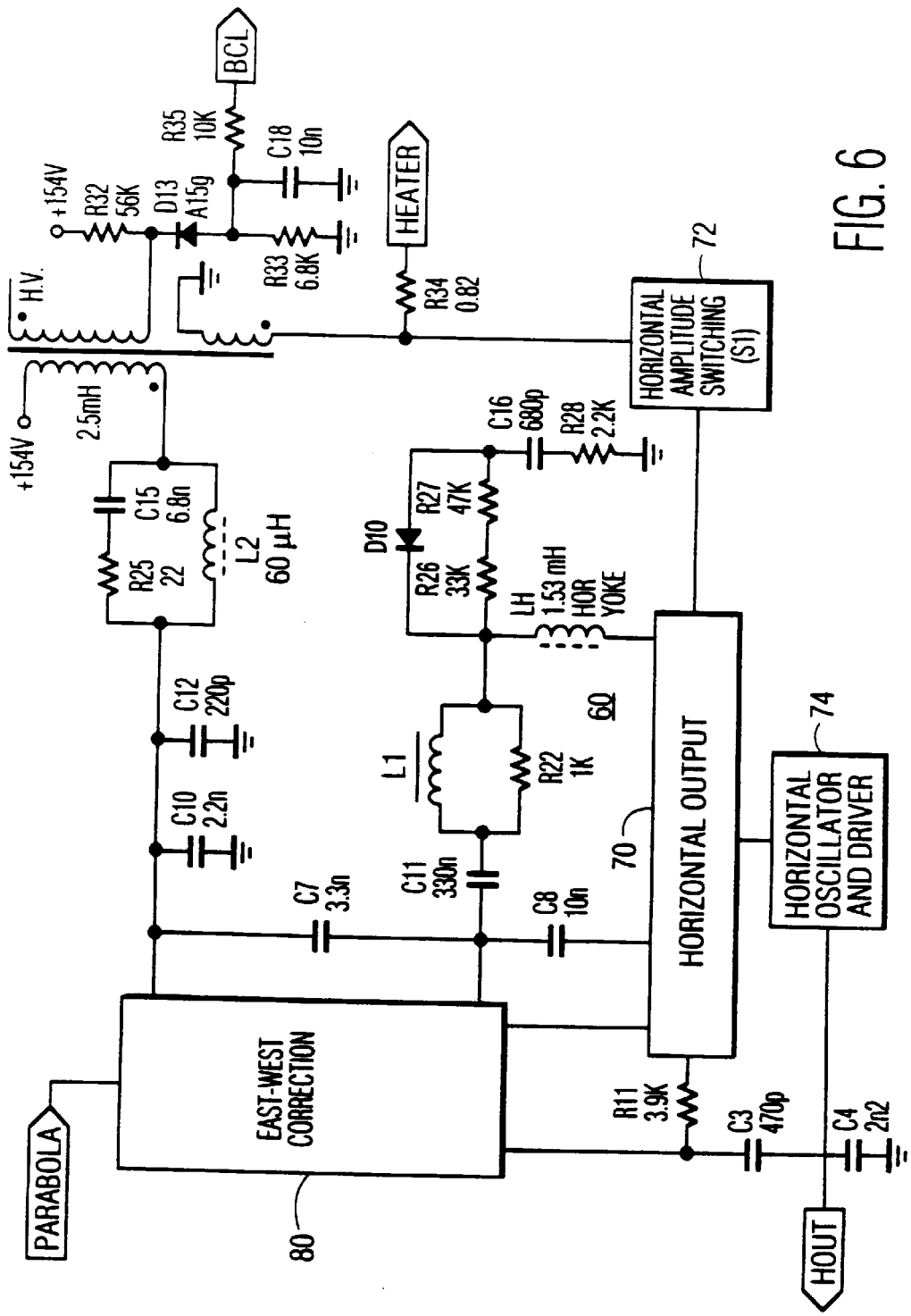
FIG. 6 is a schematic diagram of the horizontal deflection circuit shown in FIG. 1.
Figure 7:
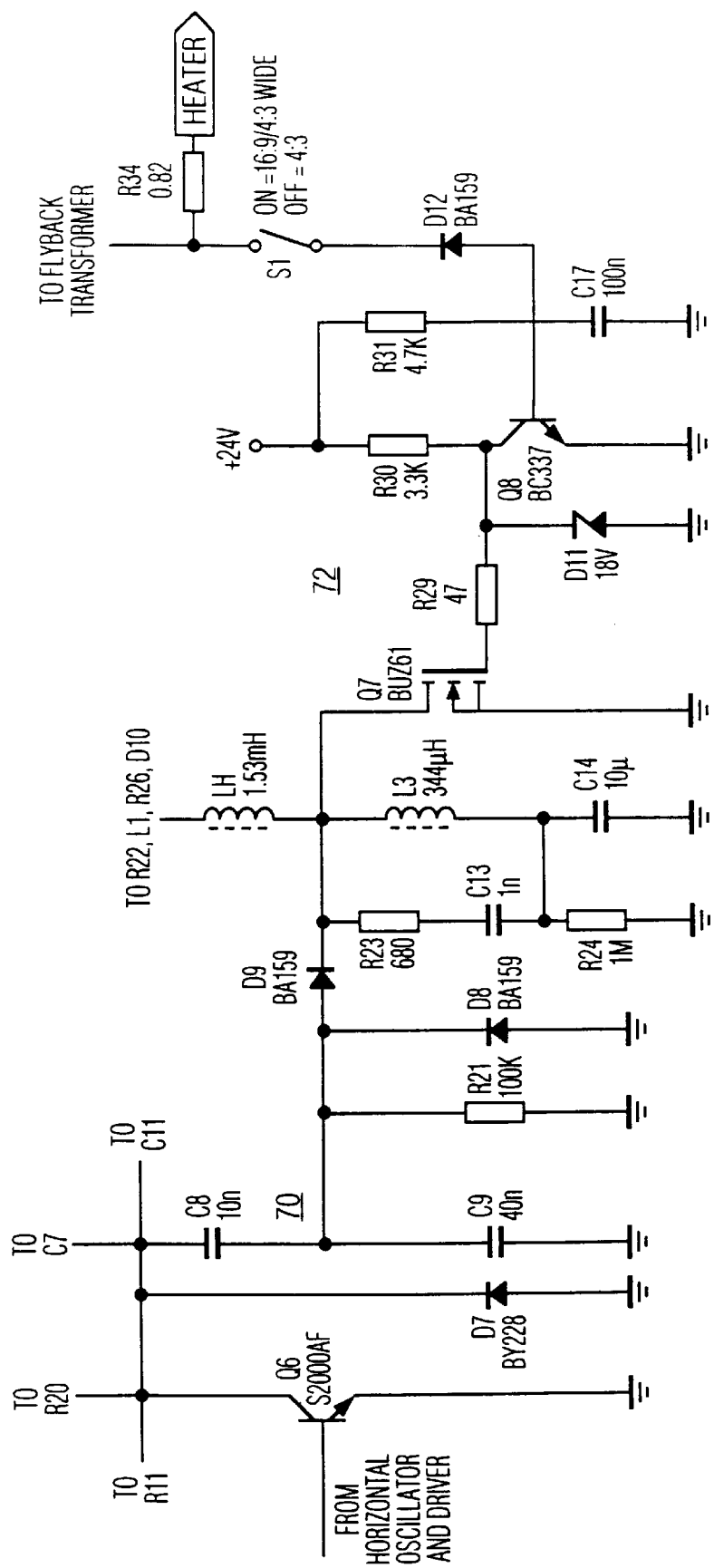
FIG. 7 is a block and schematic diagram of the horizontal output and amplitude switching circuits shown in FIG. 6.

FIG. 6 shows the horizontal deflection circuit 60. FIG. 7 shows the horizontal output circuit 70 and the horizontal switching circuit 72 in more detail. With reference to both FIGS. 6 and 7, switch S1 is open for a standard 4:3 display with dark side panels. Transistor Q8 is on, turning Q7 off and thereby connecting inductor L3 in series with horizontal yoke LH to reduce the deflection current. When S1 is closed the voltage of the heater winding of the flyback transformer is rectified by diode D12 to cut off Q8. Transistor Q7 is turned on shorting L3, thereby increasing the horizontal current for displaying 16:9 and 4:3 WIDE mode pictures.

Parasitic high frequency oscillations of the horizontal deflection current at the beginning of the trace interval are suppressed with D10, R26, R27, R28 and C16. Oscillations in the high voltage winding of the flyback transformer caused by leakage inductance is reduced by diode D13 and resistor R32. The amplitudes of the vertical and horizontal deflection currents in the different display modes are given below in Table 1.

TABLE 1

| Display Mode | Vertical Amplitude (Amps, p-p) | Horizontal Amplitude (Amps, p-p) |
|---|---|---|
| 16:9 | 1.16 | 5.8 |
| Standard 4:3 | 1.16 | 4.8 |
| Wide 4:3 | 1.48 | 5.8 |
| Zoom 4:3 | 1.32 | 5.8 |

Vertical shift downwards can be desirable with certain pictures. To realize this the vertical sync pulse must lead the video signal. Delaying the vertical pulses by the duration of one field plus or minus some lines results in shift of the picture by the same amount, upwards or downwards respectively. When such a delay is generated with analog circuits, incorrect interlace caused by jitter can become a problem.

Figure 11:
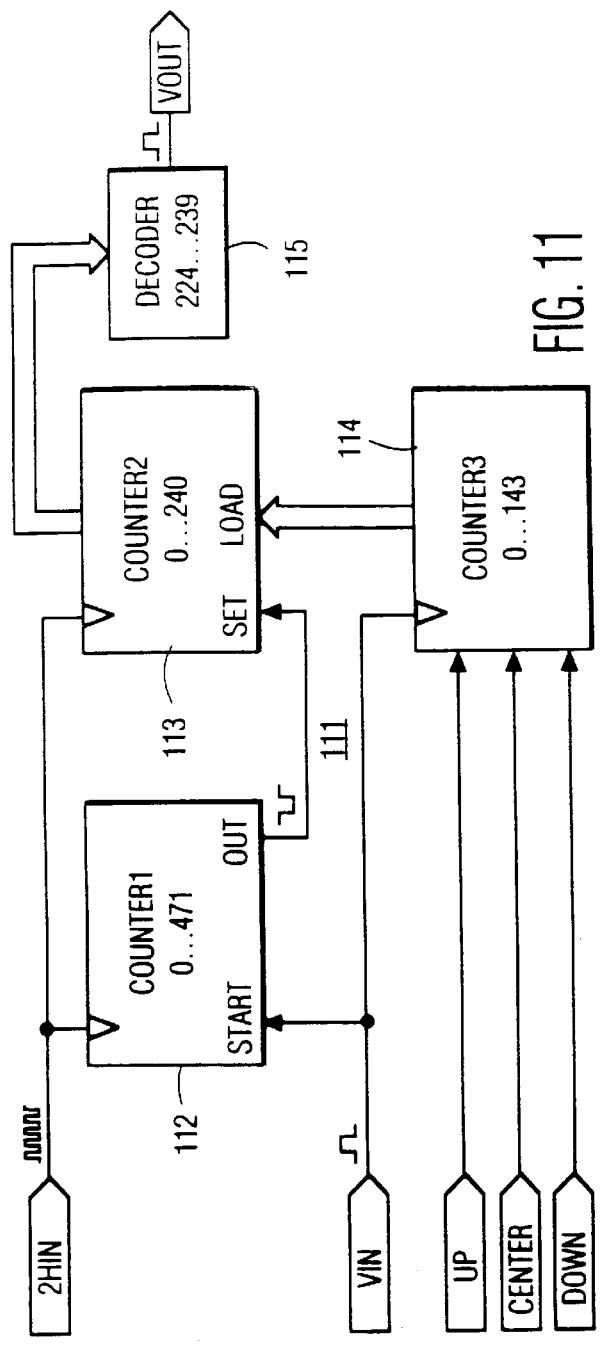
FIG. 11 is a block diagram of a digital vertical shift circuit.
Figure 12:
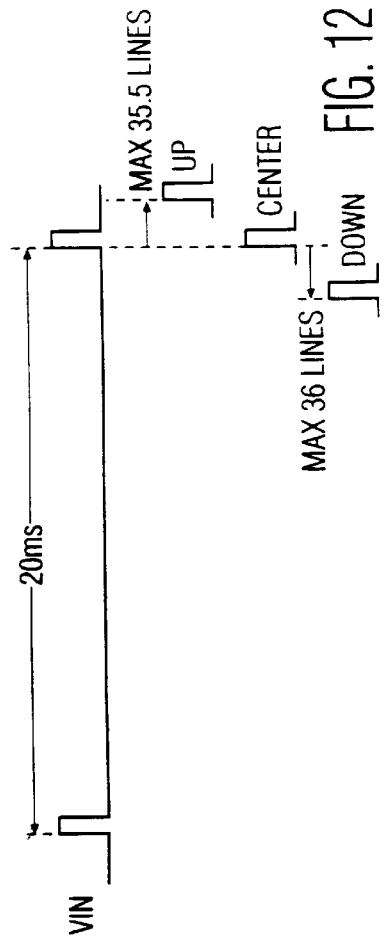
FIG. 12 is a timing diagram useful for explaining the operation of the vertical shift circuit shown in FIG. 11.

FIG. 11 shows the block diagram of a circuit 111 using digital counters 112, 113 and 114 and a decoder 115 to delay the vertical drive pulses by an integer multiple of the duration of half a horizontal line. The delay time is adjustable in increments of half a line scan period from one field interval minus 36 to plus 35.5 line periods. This results in a maximum vertical shift of the picture of 36 lines down and 35.5 lines up from the center position. This is equivalent to minus 72 to plus 71 counts. The relative phase positions of VOUT are shown in FIG. 12.

Figure 13:
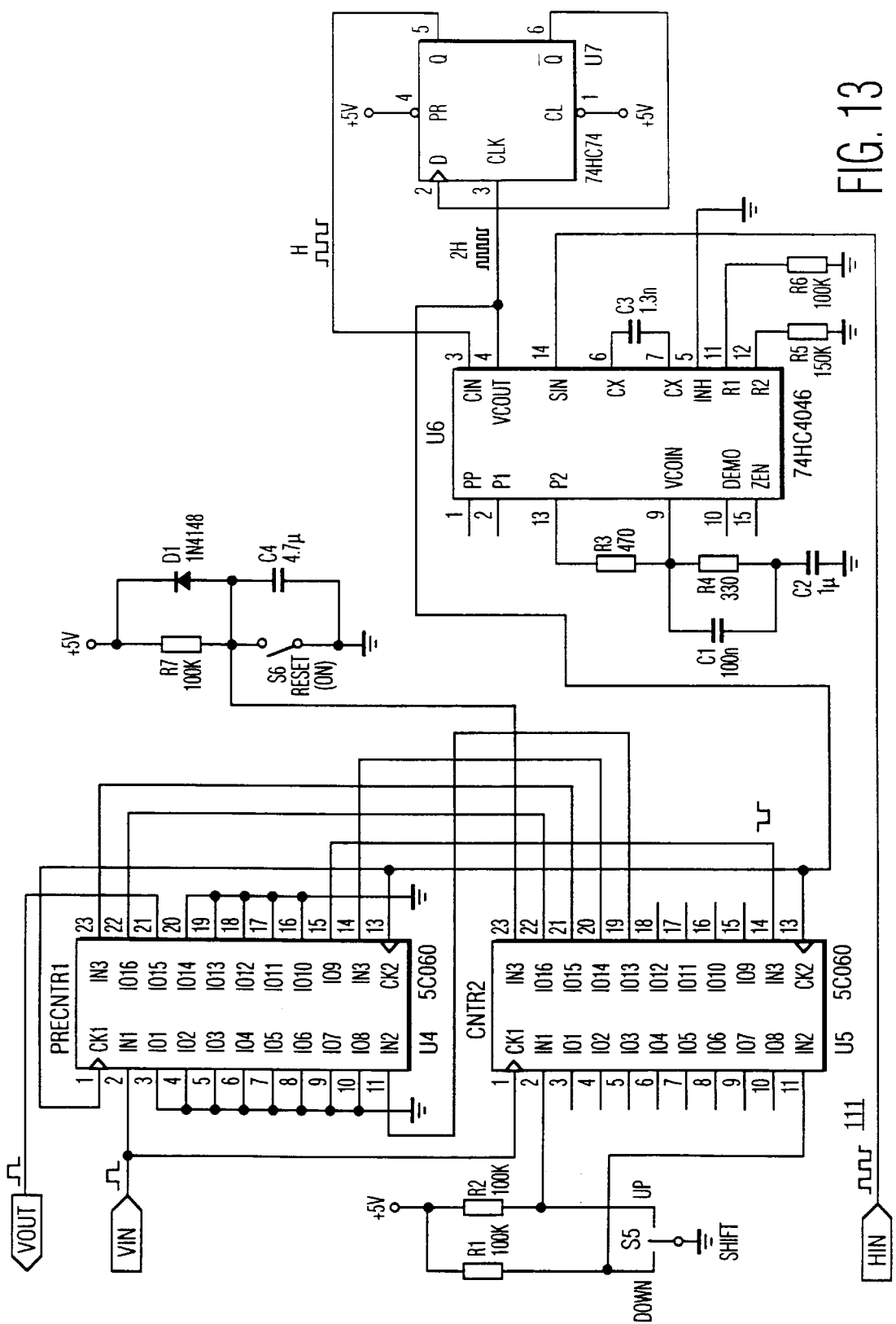
FIG. 13 is a schematic diagram of the digital vertical shift circuit shown in FIG. 11.

FIG. 13 shows the detailed diagram of the circuit 111 as having two programmable logic devices (PLD) U4, U5 and a phase locked loop (PLL) frequency doubler built around U6 and U7. PLD U4 contains counter 112 (COUNTER1) and DECODER 115. PLD U5 contains counters 113 and 114 (COUNTER2 and COUNTER3). Active low signals for vertical position control are generated by switches S5 and S6. Switch S5 provides the SHIFT UP or SHIFT DOWN function and switch S6 resets to center position. Input signals to the circuit are VIN and HIN, the vertical and horizontal drive pulses respectively. The PLL frequency doubler can be omitted if a 2 fH clock is otherwise available.

The proposed deflection system can easily be incorporated into an existing color television chassis using a wide screen picture tube for implementing a wide screen television receiver having the most desirable operating modes at minimum additional cost.

I claim:

1. A television receiver, comprising:

a video display having a raster with a wide height to width ratio;

a source of supply voltage;

a signal generator for a sawtooth waveform having a selectable amplitude;

a first switch for controlling said amplitude of said sawtooth waveform;

a vertical amplifier responsive to said sawtooth waveform and generating a vertical deflection signal which varies in accordance with said selected amplitude of said sawtooth waveform to enable selection of a vertical raster dimension;

a horizontal deflection circuit energized by said supply voltage and generating a horizontal deflection signal for a horizontal deflection yoke to provide a first horizontal raster dimension;

a signal source coupled to said horizontal yoke for modifying said horizontal deflection signal to provide a second horizontal raster dimension;

a second switch for controlling said signal source and selecting one of said first and second horizontal raster dimensions; and, a raster width distortion correction circuit responsive to the amplitude of said vertical raster dimension for modulating said supply voltage energizing said horizontal deflection circuit, to substantially correct raster width distortion for all selectable vertical raster dimensions.

2. The receiver of claim 1, wherein said raster width distortion correction circuit comprises:

a vertical rate parabola generator responsive to said vertical deflection signal for generating a vertical rate parabola; and, a modulating circuit responsive to said vertical rate parabola.

3. The receiver of claim 1, further comprising a blanking signal generator operative in accordance with said vertical deflection signal.

4. A television receiver, comprising:

a video display having a raster with a wide height to width ratio;

a source of supply voltage;

a sawtooth waveform generator responsive to a source of vertical synchronizing signals, for generating a sawtooth waveform having a selectable amplitude;

a switchable phase delay circuit for delaying said vertical synchronizing signals;

a first switch for enabling and inhibiting operation of said phase delay circuit, selection of said delayed vertical synchronizing signals providing an upwardly shifted vertical position of a picture on said video display, relative to a nominal vertical position of said picture;

a second switch for controlling said amplitude of said sawtooth waveform;

a vertical amplifier responsive to said sawtooth waveform and generating a vertical deflection signal which varies in amplitude in accordance with said selected amplitude of said sawtooth waveform to enable selection of a vertical raster dimension and which varies in phase in accordance with said selected delayed vertical synchronizing signals to enable selection of a picture position;

a horizontal deflection circuit energized by said supply voltage and generating a horizontal deflection signal for a horizontal deflection yoke to provide a first horizontal raster dimension;

a signal source coupled to said horizontal deflection yoke for modifying said horizontal deflection signal to provide a second horizontal raster dimension;

a third switch for controlling said signal source and selecting one of said first and second horizontal raster dimensions; and a raster width distortion correction circuit responsive to said vertical deflection signal and modulating said supply voltage energizing said horizontal deflection circuit, to substantially correct raster width distortion for all selectable vertical raster dimensions and said selected delayed vertical synchronizing signals.

5. The receiver of claim 4, further comprising a blanking signal generator operative in accordance with said vertical deflection signal for each phase of said selected delayed vertical synchronizing signals.

\* \* \* \* \*